United States Patent [19]

Thulin et al.

[11] Patent Number: 4,698,000

[45] Date of Patent: Oct. 6, 1987

[54] APPARATUS FOR CO-EXTRUSION OF A DOUGH MASS WITH PARTICULATE MATTER IN THE OUTER DOUGH

[75] Inventors: Robert Thulin, Wyckoff; Robert E. Ross, Wayne; Nicholas Polifroni, Cliffside Park, all of N.J.

[73] Assignee: Nabisco Brands, Inc., Parsippany, N.J.

[21] Appl. No.: 819,153

[22] Filed: Jan. 14, 1986

Related U.S. Application Data

[62] Division of Ser. No. 630,126, Jul. 12, 1984, Pat. No. 4,579,744.

[51] Int. Cl.$^4$ ............................................. B29C 47/26
[52] U.S. Cl. .............................. 425/133.1; 99/450.7; 425/462; 425/DIG. 243
[58] Field of Search ...................... 425/133.1, 132, 209, 425/462, 463, 114, DIG. 243; 264/171, 172; 426/516, 94, 283; 99/450.1, 450.4, 450.7

[56] References Cited

U.S. PATENT DOCUMENTS

| | | | |
|---|---|---|---|
| 2,101,075 | 12/1937 | Krag | 426/516 X |
| 3,196,810 | 7/1965 | Roth | 425/132 X |
| 3,228,356 | 1/1966 | Schafer | 425/462 |
| 3,249,068 | 5/1966 | Gembicki | 425/133.1 |
| 3,572,259 | 3/1971 | Hayashi | 425/209 X |
| 3,778,209 | 12/1973 | Wallace et al. | 425/133.1 |
| 4,251,201 | 2/1981 | Krysiak | 425/133.1 X |
| 4,303,431 | 12/1981 | Torobin | 425/462 X |
| 4,447,458 | 5/1984 | Roth et al. | 425/133.1 X |
| 4,511,318 | 4/1985 | Kolodesh et al. | 426/94 X |
| 4,528,900 | 7/1985 | Simelunas | 99/450.7 |

Primary Examiner—Richard L. Chiesa
Attorney, Agent, or Firm—Richard Kornutik

[57] ABSTRACT

A continuous co-extruded food product is formed having dissimilar inner and outer portions wherein the inner portion is enveloped by the outer portion and the outer portion is a dough containing particulate material such as chocolate chips. The product is formed by an inner extrusion port being recessed a distance d from an outer extrusion port with the distance d being sufficient for permitting particulate material in the outer dough portion to pass through an exit passage between the inner and outer extrusion ports without clogging or agglomeration. Turbulence is induced in the outer dough portion which envelops the inner portion thereby causing the particulate material to tumble whereby at least a portion of the particulate material partially penetrates the exterior surface of the outer dough portion enveloping the inner portion. Dough is removed from the surface of the part of the particulate material penetrating the exterior surface of the outer dough portion. In a preferred embodiment, the outer extrusion port includes a land surface generally parallel to the axis of the outer extrusion port and a bevel surface at the interior surface of the outer extrusion port. The land surface intersects the beveled surface at a generally sharp line of intersection. The generally sharp line of intersection and the bevel surface cause the tumbling of the particulate material. The land surface removes dough from the surface of the particulate material which penetrates the exterior surface of the outer dough portion.

7 Claims, 5 Drawing Figures

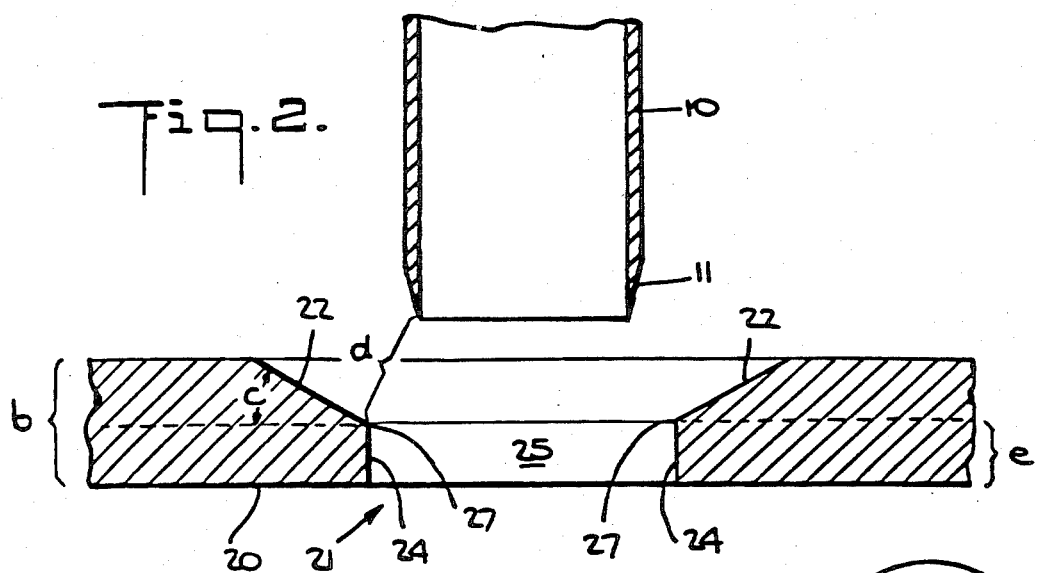
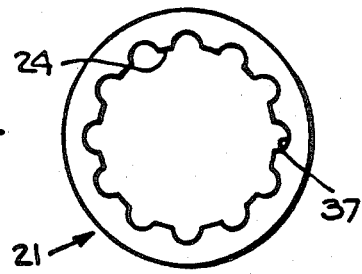
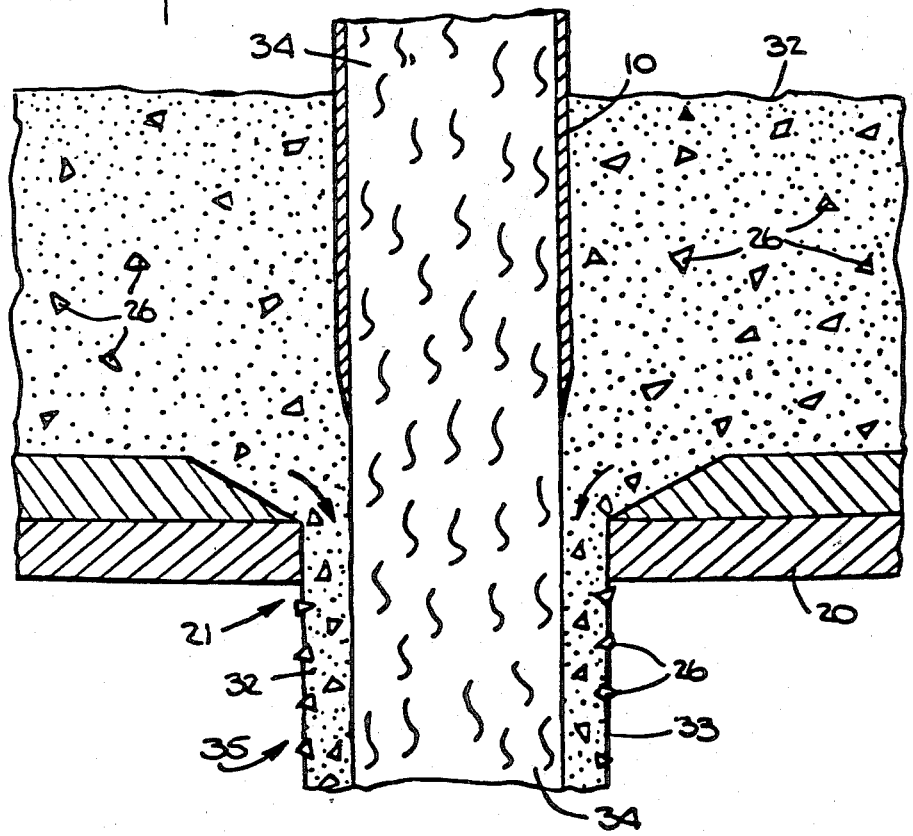

APPARATUS FOR CO-EXTRUSION OF A DOUGH MASS WITH PARTICULATE MATTER IN THE OUTER DOUGH

This is a division of application Ser. No. 630,126, filed July 12, 1984, from which issued U.S. Pat. No. 4,579,744 on Apr. 1, 1986.

FIELD OF INVENTION

The present invention relates to the manufacture of edible products having dissimilar inner and outer portions. More particularly, the present invention is directed to the manufacture of food products wherein an inner dough portion is enveloped by an outer dough portion and the outer dough portion contains particulate matter.

BACKGROUND OF THE INVENTION

The types of products to which the present invention relates include baked goods that are baked from dough pieces having an outer layer of farinaceous dough and a core which may be a dissimilar dough or another material such as a jam, cream, puree, paste, or other extrudable form of fruit, cheese, meat, vegetable, confection or other edible substance. In those products where the core is also a dough, the inner and outer doughs would be advantageously dissimilar in composition so as to produce different tastes, colors, appearances, textures, consistencies, or the like in the inner and outer portions of the baked product. Regardless of the composition of the inner and outer portions, the present invention is directed to products having particulate matter, such as chocolate chips, candied fruit, nuts, raisins, and the like, in the outer portion.

In the past, products having different inner and outer portions have been formed by concentrically extruding an extrudate rope as shown in U.S. Pat. No. 3,572,259 to Hayashi.

An automatic machine for making filled baked goods is described in U.S. Pat. No. 3,196,810 to Roth. In this patent, a plurality of dies dispose flavoring material within a dough. U.S. Pat. No. 3,778,209 to Wallace et al. discloses an apparatus for forming a food extrusion in which an inner meat food is totally enrobed by an outer moldable food by using a co-extrusion nozzle and a pair of augers to force food products through the co-extrusion nozzle from a respective pair of food hoppers. Augers are particularly useful for the extrusion of foods, such as dough, in order to achieve a consistent quality, reliability and high efficiency in the high speed manufacture of snacks such as cookies, chocolate layered foods and the like.

In the manufacture of co-extruded food substances, it is common to require that the outer food substance encapsulates or enrobes an inner food substance. In U.S. Pat. Nos. 3,778,209 to Wallace et al. and 3,249,068 to Gembicki, the enrobing action is obtained by controlling the motion of a plunger or piston used in connection with the feeding of the food material to be encapsulated. In U.S. Pat. No. 4,251,201 to Krysiak, an enrobed food piece is produced with an apparatus that includes specially sequenced feed mechanisms used to co-extrude an inner and outer food product from coaxial dies in combination with a sequence coordinated iris shaped cut-off valve that is closely mounted to the discharge ports of the extrusion dies. The iris valve cuts the co-extrusion just at a time when the feed of both the inner filler and outer enrobing foods is interrupted and the space in which the valve acts is essentially filled with the outer enrobing food. This technique appears to depend upon a relatively easy flowability of the outer food substance so as to coat the rear of the inner food while the iris valve is about to close and appears limited in operating speed because the feed of both inner and outer foods must be interrupted for each food piece manufactured.

More recently, relatively high speed methods and apparatuses have been developed whereby an inner dough coextruded with an outer dough is enrobed by severing the outer dough with a blunt severing edge or a severing element which simultaneously draws the outer dough over the inner dough on both sides of a severed element to form a fully enrobed food piece. See, for example, commonly-assigned U.S. patent application Ser. No. 06/507,401 now abandoned.

In all the known methods discussed above, there is no disclosure of including particulate matter in the outer dough portion. Consequently, none of the reference disclose any method or apparatus which facilitates inclusion of particulate matter in the outer portion of a co-extruded dough rope.

Experience in the art of co-extrusion has taught that certain difficulties are encountered in extruding an outer tube of doughy mass containing particulate matter. For example, the normal configuration of the die head is such that the annular space between the outside circumference of the inner extrusion port and the inside of the outer extrusion port prevents smooth passage of the particulate matter. In some cases, the space when adjusted to provide the proper flow rate and tube thickness is simply too small to allow passage of the particles. Another problem encountered is the agglomeration of particles as they enter the exit passage which blocks the flow of extrusion or causes an uneven outer tube of dough.

When it is desired to extrude a particle-containing outer tube of dough mass to produce an attractive relatively smooth-skinned confectionery or cookie having the particulate matter appear as if placed thereon externally or prepared by hand, the problems are intensified. The particles are desirably free from a partial covering by the doughy mass. This enhances the appearance of the finished product which is an important commercial consideration. In order to enhance the product's appearance, the particles should penetrate the exterior surface of the outer dough and should be free of a partial covering by the doughy mass.

A further consideration relative to extruding the outer tube of doughy mass with particles is that the integrity of the outer dough portion should be maintained, especially in the case of co-extruded cookie dough, so that the final product appears wholly handmade. Any discontinuities through which the inner portion can be seen significantly erodes the appearance of a handmade quality for the product.

Moreover, it would be desirable that each of the above considerations be resolved while maintaining high speed production.

OBJECTS OF THE INVENTION

It is therefore an object of the present invention to overcome the problems hereinbefore discussed with respect to co-extruding a two-component doughy mass having an inner and outer portion in which the outer portion contains particulate material.

It is a further object of the present invention to provide a method and apparatus for co-extruding an inner doughy mass and an outer doughy mass containing particulate material wherein at least a portion of the particles in the outer doughy mass penetrate the exterior surface of the outer doughy mass and any partial dough covering of the particulate material penetrating the exterior surface of the outer doughy mass is substantially removed.

It is yet another object of the present invention to provide a method and apparatus for the manufacture of chocolate chip cookie products comprising a dissimilar inner dough and an outer dough by means of co-extrusion of the inner dough and a chocolate chip containing outer dough wherein the chocolate chips penetrate the outer dough exterior surface and the resultant chocolate chip cookie product has a commercially desirable handmade appearance.

These and other objects of the present invention will become apparent from the following description and claims in conjunction with the drawings.

SUMMARY OF THE INVENTION

The present invention includes a method and apparatus useful for forming a continuous food extrudate having dissimilar inner and outer portions wherein the inner portion is enveloped by the outer portion and the outer portion is a dough containing particulate material. The apparatus of the present invention has an inner extrusion port through which the inner portion is extruded and an outer extrusion port. The outer extrusion port has a generally annular extrusion orifice greater in area than the crosssectional area of the extrusion orifice of the inner extrusion port. Turbulence-inducing means are provided on the outer extrusion port. The inner extrusion port is recessed from the outer extrusion port a distance sufficient to allow passage of the outer dough containing particulate material therebetween without agglomeration of the particles. This distance is suitably at least about 1.25 times the maximum dimension of the particulate material in the outer doughy mass.

In one embodiment, the turbulence-inducing means includes a generally annular beveled edge on the interior side of the orifice of the outer extrusion port contiguous with a generally annular land surface generally parallel with respect to the axis of outer extrusion port. The annular beveled edge meets the annular land surface at a substantially sharp intersection. The generally annular land surface has a length sufficient to remove dough coverings from the parts of the particles penetrating the exterior surface of the outer dough portion. Preferably, the angle of the beveled edge is between about 15° and about 60°, while the annular land surface is from about 1/16 inch to about 5/16 inch in length and is preferably about 3/16 inch in length.

The method of the present invention for forming a dough extrudate having dissimlar inner and outer portions wherein the inner portion is enveloped by the outer portion and the outer portion contains particulate matter includes extruding a first doughy mass under pressure through an inner extrusion port, and extruding a second doughy mass, dissimilar to the first doughy mass and containing particulate matter, under pressure through a generally annular exit passage formed by the inner extrusion port being recessed from the outer extrusion port a distance sufficient to prevent agglomeration of the particles in the outer doughy portion within the exit passage. The particle-containing second doughy mass is extruded around and in intimate contact with the first doughy mass while the particles in the second or outer doughy mass tumble in response to turbulent flow induced by turbulence-inducing means so that at least a portion of the particles partially penetrate the exterior surface of the outer dough portion. Dough coverings of the part of the particles penetrating the exterior surface of the outer dough portion are removed.

In one preferred embodiment of the present invention, the outer dough portion is a chocolate chip cookie dough containing chocolate chips as the particulate material. The inner doughy mass is a dissimilar chocolate chip cookie dough which may include a humectant so that the dough remains moist and chewy, even after baking. If desired, the inner doughy mass may also contain chocolate chips to enhance the flavor and sweetness of the inner dough.

The present invention provides a continuous dough extrudate having dissimilar inner and outer dough portions. The outer portion envelopes the inner portion and contains particulate matter. During the co-extrusion, the particles are tumbled to a degree sufficient to penetrate the exterior surface of the outer portion of the extrudate. Moreover, the co-extruded dough rope has a smooth overall appearance without any discontinuities or voids in the outer portion through which the inner doughy mass can be seen, and there is no partial covering or "skin" of the doughy mass over the particles which have penetrated the exterior surface of the outer dough portion.

The present invention can easily be adapted for use in a high speed process without extensive modifications to existing equipment.

BRIEF DESCRIPTION OF THE DRAWINGS

In the drawings forming part hereof:

FIG. 2 is a simplified schematic cross-sectional view of an embodiment similar to that illustrated in FIG. 1 of a co-extrusion apparatus in accordance with the present invention;

FIG. 3 is a simplified schematic cross-sectional view similar to that of FIG. 2 which further illustrates an inner doughy mass and outer doughy mass containing particulate material;

FIG. 4 is a simplified schematic illustration of an alternate embodiment of an outer extrusion port which may be used with the apparatus of FIG. 1.

DESCRIPTION OF THE PREFERRED EMBODIMENTS

In order to provide a more complete understanding of the present invention and an appreciation of its advantages a detailed description of preferred embodiments is presented below.

Figure 1:
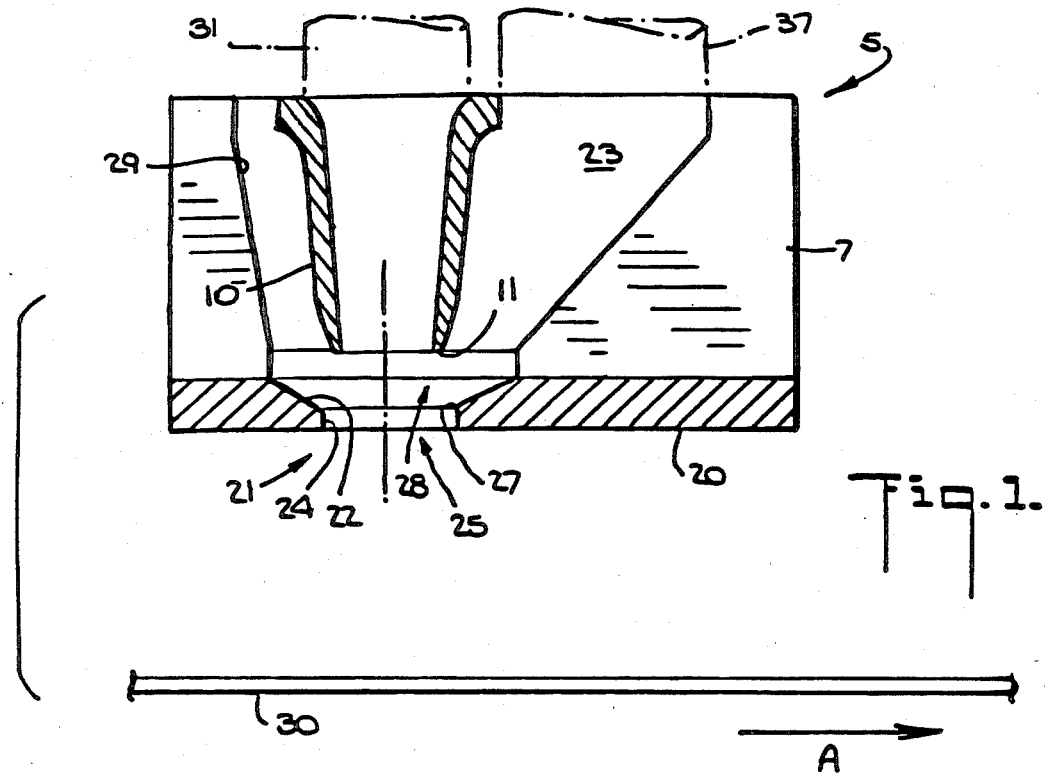
FIG. 1 is a schematic side view, partially in cross-section, of one embodiment of a co-extrusion apparatus in accordance with the present invention.

FIG. 1 is a schematic representation of a coextrusion apparatus 5 in accordance with the present invention. The co-extrusion apparatus 5 comprises a die casing 7 and an inner filler tube or inner extrusion conduit 10.

The end of inner extrusion conduit 10 terminates with inner extrusion port 11. Surrounding filler tube or inner extrusion conduit 10 is outer extrusion conduit 23 which is defined by the outer wall of inner extrusion conduit 10 and the wall 29 of die casing 7. Mounted on the bottom of die casing 7 and positioned below inner extrusion port 11 is extrusion die plate 20 in which is provided outer extrusion port 21. Positioned below outer extrusion port 21 is conveyor means 30 for receiving and transporting the co-extruded doughy rope to, e.g., an oven.

Apparatus for the manufacture of food products having dissimilar inner and outer portions by co-extrusion through concentric inner and outer extrusion nozzles or conduits are themselves well known and do not require detailed discussion. Examples of prior art apparatus are shown in the prior art patents discussed in the foregoing.

In accordance with conventional constructions, an inner doughy mass would be fed via conduit means from a first hopper to inner extrusion conduit or filler tube 10 by conventional means (not illustrated). Likewise, an outer doughy mass would be fed via conduit means from a second hopper to the outer extrusion conduit means 23 by conventional means (not illustrated). Means for feeding the inner doughy mass to filler tube 10 and the outer doughy mass to the outer extrusion conduit 23 may be, e.g., well known auger devices. Feeding of the doughy masses through the extrusion conduits may also be accomplished by appropriate gas pressure. The manner and means of feeding doughy masses to inner and outer co-extrusion conduits are well known in the art and form no part of the present invention. Therefore, they are not discussed in detail herein.

Conduit means 31 and conduit means 37 are illustrated in phantom in FIG. 1 and represent means for feeding the inner doughy mass to filler tube 10 and the outer doughy mass to outer extrusion conduit 23 respectively. As illustrated in FIG. 1, the outer extrusion conduit 23 is greater in area on the right hand side of the figure where the outer doughy mass is fed into the outer extrusion conduit. The outer doughy mass surrounds the inner filler tube 10 and is forced through exit passage 28 between inner extrusion port 11 and bottom die plate 20 whereby the outer doughy mass surrounds and envelopes the inner doughy mass extruded through the inner extrusion port 11. The composite outer doughy mass enveloping the inner doughy mass is forced or co-extruded through the outer extrusion port 21 of extrusion die 20. The general arrangement of such co-extrusion devices are themselves well known in the art.

Inner filler tube 10 and the inner extrusion port 11 may assume a variety of geometrical cross-sections. Suitably, the geometrical cross-section of filler tube 10 and inner extrusion port 11 is circular. Similarly, annular-like outer extrusion conduit 23 and outer extrusion port 21 may assume a variety of geometrical cross-sections. Suitably, outer extrusion port 21 has a circular cross-section. The crosssectional area of outer extrusion port 21 is greater than the cross-sectional area of the inner extrusion port 11 in order that the outer doughy mass may envelop the inner doughy mass to provide the co-extruded rope-like product having dissimilar outer and inner portions in accordance with the well-known practice of the art.

As illustrated in FIG. 1, the left periphery of inner extrusion port 11 is positioned in approximate alignment with the left land surface 24 of the outer extrusion port 21 of bottom die plate 20. Such an alignment is found advantageous for producing a satisfactory product when the co-extruded rope-like product having dissimilar outer and inner portions is received and transported away by conveyor means 30 moving to the right as indicated by the arrow A in FIG. 1. That is, when the conveyor means 30 is moving as indicated by the arrow A, best results in the quality of the co-extruded product are not generally obtained by concentrically positioning the inner extrusion port 11 with respect to the outer extrusion port 21. The exact lateral positioning of the inner extrusion port 11 with respect to the outer extrusion port 21 for producing an optimum quality product may vary slightly depending on the composition of the inner and outer doughy masses and the linear speed of conveyor means 30 but can be routinely determined in view of the foregoing general guidance. Means (not illustrated) would be provided to laterally move die casing 7 and thereby outer extrusion port 21 with respect to inner extrusion port 11.

In accordance with the present invention, particulate material, such as chocolate chips, are disposed in the outer doughy mass which is forced through the outer extrusion conduit 23. In accordance with the present invention, means are provided to tumble the particulate material of the outer doughy mass enveloping the inner doughy mass so that at least a portion of the particulate material penetrates the exterior surface of outer doughy mass portion of the co-extruded rope-like product formed from dissimilar inner and outer portions. Further, in accordance with the present invention, means are provided whereby partial covering of the particles penetrating the exterior surface of the outer portion of the co-extruded product are removed.

The method and apparatus in accordance with the present invention will now be explained in greater detail with reference to FIG. 1 and FIG. 2 wherein FIG. 2 is a schematic detail illustration of filler tube 10 and the bottom die plate 20. Reference is also made to FIG. 3, which is similar to FIG. 2, and which schematically illustrates the co-extrusion of inner doughy mass 34 and outer doughy mass 32 containing particulate material 26 whereby co-extruded rope-like product 35 is formed from dissimilar inner dough 34 and outer dough 32 and a portion of the particulate material 26 penetrates the exterior surface 33 of the outer dough 32 of the rope-like product 35. In FIGS. 2 and 3, inner extrusion port 11 is illustrated positioned generally concentric with outer extrusion port 21 for clarity of illustration. However, as hereinbefore discussed, such positioning of the inner extrusion port 11 with respect to the outer extrusion port 21 is not always optimum for all operating conditions.

Outer extrusion port 21 having an orifice 25 is formed in bottom die plate 20 and includes an annular land surface 24 and an annular bevel surface 22 on the interior side of outer extrusion port 21. Annular land surface 24 intersects annular bevel surface or edge 22 at point 27 thereby forming an annular line of intersection. Annular land surface 24 is a peripheral surface of outer extrusion port 21 and is parallel to the axis of outer extrusion port 21. Bevel surface 22 is located on the inner or interior side of the outer extrusion port 21 (i.e., the side of outer extrusion port 21 facing the inner extension port 11). Bevel surface 22 extends around the perimeter of the outer extrusion port 21. Bevel edge or surface 22 is formed at an angle c with a line perpendicular to the axis of outer extrusion port 21 or therefore with the surface of land surface 24.

The turbulence inducing means, in accordance with the present invention, comprises bevel edge or surface 22 and the line of intersection 27 between bevel edge 22 and land surface 24. It is important that the line of intersection 27 between bevel surface 22 and land surface 24 be substantially sharp. This substantially sharp intersection 27 is very effective for inducing turbulence in particulate matter 26 of the outer dough 32.

By substantially sharp is meant that it is permissible for the line of intersection 27 to have a very small radius. A very small radius may be desirable from a practical viewpoint to prevent an operator, e.g., from inadvertently cutting himself when handling the apparatus. A sharp line of intersection (i.e., not even having a small radius) would otherwise give totally satisfactory performance. It is important, however, that there not be a large radius at the intersection between bevel edge 27 and the annular land surface 24. A large radius would not result in the desired creation of turbulence in the outer dough 32 and the tumbling of the particulate material 26 and therefore the subsequent satisfactory penetration of the exterior surface 33 of the composite rope-like product 35 will not be achieved.

The land surface 24 having a length parallel to the axis of outer extrusion port 21 serves to remove partial dough covering or dough skin from the particulate material 26 which penetrates the outer dough surface 33 of the outer dough due to the tumbling of particulate material 26 caused by the line of intersection 27. The length of the land surface 24 must be sufficient to substantially remove any partial dough covering or skin from the particulate material 26 which penetrates the outer exterior surface 33 of the outer dough. However, if the length of land surface 24 is too long, it may function to push the particulate material 26 which has penetrated the outer dough surface 33 back into the dough.

In accordance with the present invention, the inner extrusion port 11 of filler tube 10 is recessed from the outer extrusion port 21 a distance d. Recessing the inner extrusion port 11 a distance d from the outer extrusion port 21 defines an exit passage 28 through which the outer doughy mass containing particulate material 26 passes as it begins to envelop the inner doughy mass 34 exiting the inner extrusion port 11. The distance d is selected to be sufficient to permit passage of the particles of the particulate material 26 contained in the outer dough 32 through the exit passage 28 without clogging or agglomeration.

Advantageously the distance d is selected to be at least about 1.25 times the maximum dimension of the largest particles 26 disposed in the outer doughy mass 32 in order to prevent agglomeration or clogging of the particulate material 26 in the annular exit passage 28. In most applications, d would not equal more than approximately 2 because as d gets larger in most instances the cross-sectional area of orifice 25 of the outer extrusion orifice 21 would tend to grow rapidly larger and the thicknes of the outer doughy mass 32 would tend to become large with respect to the thickness of the inner doughy mass 34 of the rope-like co-extruded product 35 and thereby not result in what is usually considered a desirable commercial product. It will be understood that the distance d is not defined by random very large particles which do not conform to the intended commercial particle size or grade. In general, the closest distance d from the inner extrusion port 11 to the outer extrusion port 21 is about 5/16 inch to about 7/16 inch with 5/16 inch being satisfactory in many applications.

The land surface 24 may be circular having a constant diameter and a smooth surface. If land surface 24 is circular, suitable diameters for the outer extrusion port orifice 25 are from about 11/16 inch to about 1⅛ inch. The orifice of the inner extrusion port is suitably circular in cross-section having a diameter of from about 9/16 inch to about 1 inch. The cross-sectional area of the orifice of the outer extrusion port 21 would be greater than the cross-sectional area of the orifice of the inner extrusion port 11. Good results have been achieved when the outer extrusion port orifice has a diameter of 27/32 inch and the inner extrusion port orifice has a diameter of 5/8 inch. As hereinbefore discussed, the inner extrusion port 11 and the outer extrusion port 21 do not have to have a circular or annular cross-section. Other cross-sectional geometries forming a closed perimeter can give satisfactory results and this is referred to herein as generally annular.

The angle c of the beveled edge 22 is generally greater than about 15°. Very satisfactory results have been achieved when the angle c is 60°. Suitable lengths for the land surface 24 parallel to the axis of the outer extrusion port 21 (dimension e of FIG. 2) are from about 1/16 inch to about 5/16 inch with a length of about ⅛ inch having been found satisfactory.

The bottom die plate 20 having the outer extrusion port 21 formed therein may be fabricated from a single molded or machined material as illustrated in FIG. 2 or it may be fabricated from an inside plate having the beveled surface or edge 22 bonded in combination with an outside plate of the same or different material which provides the annular land surface 24 as illustrated in FIG. 3. In either case, the sharp or generally sharp line of intersection 27 will be provided between the beveled edge 22 and the land surface 24.

As illustrated in FIG. 4, the land surface 24 of the outer extrusion port 21 may be provided with longitudinal scallops 37, i.e., scallops extending in the direction of the axis of the outer extrusion port 21. If used, the scallops desirably would be of a size so as to prevent complete entry of particles of the particulate matter 26 disposed in the outer doughy mass 32.

Figure 5:
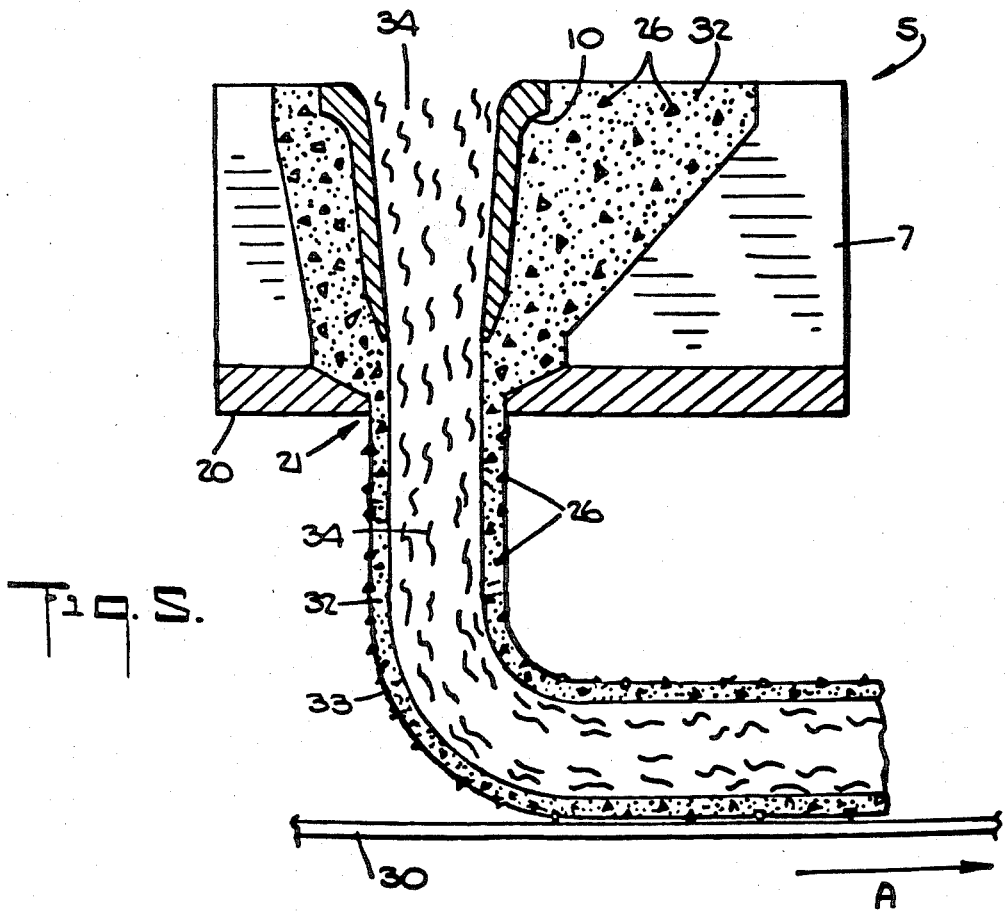
FIG. 5 is a schematic side view, partially in cross-section, similar to that of FIG. 1 which further shows an inner doughy mass and an outer doughy mass containing particulate material and illustrates operation in accordance with one embodiment of the present invention.

Operation of the present invention may be described in conjunction with FIG. 3 and FIG. 5. An inner dough 34 is fed under pressure through filler tube or inner extrusion conduit 10 by means such as an auger or gas pressure as hereinbefore discussed. An outer dough 32 which is dissimilar to the inner dough 34 is fed under pressure through outer extrusion conduit 23. In accordance with the present invention, the outer dough 32 contains particulate material 26. The inner dough 34 exits inner extrusion port 11 and is enveloped by the outer dough 32 which exits the annular exit passage 28. The inner dough 34 enveloped by the outer dough 32 passes through the outer extrusion port 21. The particulate material 26 in the outer dough 32 is caused to tumble as the outer dough passes over bevel edge 22 and the substantially sharp line of intersection 27. The substantially sharp line of intersection 27 is of particular importance in the embodiment described for causing tumbling of the particulate material 26 or stated otherwise, inducing turbulence in the outer doughy mass 32 whereby tumbling of the particulate material 26 takes place.

At least a portion of the particles of the particulate material 26 which has been caused to tumble by the turbulence inducing means will partially break through the exterior surface 33 of the outer doughy mass 32 as the inner doughy mass 34 and the outer doughy mass 32 co-extruded product passes through the land surface 24. The land surface 24 substantially removes partial dough coverings or skin from the particulate matter 26 that has penetrated the exterior surface 33 of the outer doughy mass 32. It will be appreciated that a portion of the particulate material 26 will remain embedded within the outer doughy mass 32. However, a sufficient amount of particles of the particulate material 26 will be tumbled at or near the surface of the outer doughy mass to render the desired appearance to the extruded dough rope-like product 35.

The composite doughy rope-like product 35 exits the outer extrusion port 21 and is received and transported away by horizontally disposed conveyor means 30. Typically, the composite doughy rope-like product 35 on conveyer means 30 would be cut into individual portions by any convenient cutting means which are well known in the art. The cut portions of the rope-like product would be further transported to an oven for baking.

The operation of the apparatus and method of the present invention would most advantageously be carried out continuously in an automated process. The composite doughy rope-like product 35 may be extruded at a rate as low as about 2 feet/minute and the desired tumbling effect will be achieved. The maximum speed of extrusion of the rope-like product 35 may be typically 35 feet/minute. The maximum speed of extrusion of the rope-like product 35 is determined by practical considerations such as the size of the oven and the avoidance of tears in the outer dough 32 of the composite rope-like product 35. In general, the conveyer means 30 picks up and carries away the co-extruded composite dough rope-like product 35 at a speed equal to or just slightly greater than the speed of extrusion so that the rope-like product 35 is oriented in the direction of travel of the conveyer means 30 but is not overly extended so as to cause unsightly discontinuities in the outer dough portion.

The method and apparatus of the present invention may be readily adapted for use on many co-extrusion apparatuses for manufacturing food products having dissimilar inner and outer portions.

The apparatus and method of the present invention is highly advantageous for the automated manufacture of chocolate chip cookies having a dissimilar inner dough and outer dough and wherein the finished product has a commercially desirable handmade appearance. In accordance with a preferred embodiment of the present invention, the inner dough 34 would be a chocolate chip cookie dough with or without chocolate chips. The outer dough 32 would also be a chocolate chip cookie dough, suitably dissimilar to the inner dough, and, in accordance with the present invention, would contain chocolate chips. The chocolate chip cookies would be manufactured by the apparatus and method in accordance with the present invention as hereinbefore described. Suitably, the inner dough would contain a humectant in order to render the finished product with a moist and chewy inner texture after baking. The outer dough can be a normal chocolate chip cookie dough which takes on a crispy brown appearance and texture after baking.

The size of the chocolate chips, i.e. the particulate matter 26, in the outer dough mass 32 can be of the size which provides from about 1,500 chips per pound to about 10,000 chips per pound. An advantageous chip size is about 4,600 chips per pound to about 5,000 chips per pound with about 4,800 chips per pound being a particularly desirable chip size. The concentration of chocolate chips in the outer dough 32 at the exit passage 28 may be from about 3% to about 40% by weight based on the dough and is suitably about 7% to about 20% by weight. A concentration of chocolate chips of about 15% by weight based on the dough has been found useful. The specific embodiments herein before described are particularly useful for the manufacture of chocolate chip cookies. The inner dough may or may not contain manufacture of chocolate chip cookies. Satisfactory cookies can be made without chocolate chips in the inner dough.

Chocolate chip cookie product prepared in accordance with the method and apparatus of the present invention has chocolate chips dispersed over and penetrating the entire exterior surface of the cookie without the presence of an unappealing or unsightly thin layer of baked dough crust covering the chocolate chips. The chocolate chip cookie product which is prepared by the method and apparatus in accordance with the present invention has a commercially desirable handmade appearance even though it is prepared by an automated, continuous method of manufacture.

In comparison, chocolate chip cookies prepared by conventional co-extrusion methods and apparatus for food products having dissimilar outer and inner portions will not have chocolate chips protruding through the exterior surface of the outer dough and uncovered by a baked doughy layer.

Although preferred embodiments of the method and apparatus of the present invention have been described in detail, it is contemplated that changes and modifications may be made thereto by one skilled in the art all within the spirit and scope of the present invention as described herein and as defined in the appended claims.

What is claimed is:

1. A co-extrusion apparatus for forming a composite food product having dissimilar inner and outer portions, wherein the inner portion is enveloped by the outer portion, and the outer portion is a dough which contains particles, comprising:
   an inner extrusion port having an exit orifice with a first cross-sectional area through which the inner portion is extruded;
   an outer extrusion port, including
   an exit orifice with a second cross-sectional area greater than said first cross-sectional area;
   means for substantially removing dough from the parts of the particles that penetrate the exterior surface of the outer dough portion, said removing means being positioned adjacent said exit orifice and within said outer extrusion port; and
   means for inducing turbulence in the outer dough portion, including
   a generally bevelled surface formed in said outer extrusion port the angle between said bevelled surface and said removing means being about 60°; and
   a generally annular and sharp line of intersection between said bevelled surface and said removing means, whereby a tumbling motion is imparted to the particles carried within the outer dough portion for causing at least a portion of the particles to penetrate the exterior surface of the outer dough portion;

wherein said inner extrusion port is recessed a distance d from said exit orifice of said outer extrusion port to define an exit passage between said inner extrusion port and said outer extrusion port, said distance d being sufficient to permit the particles carried in said outer dough portion to pass through said exit passage;

first conduit means communicating with said inner extrusion port for providing the inner portion thereto; and second conduit means communicating with said outer extrusion port for providing the outer dough portion thereto, the outer dough portion enveloping the inner portion to form a composite food product having dissimilar inner and outer portions.

2. An apparatus as recited in claim 1 wherein said distance d is at least about 1.25 times the largest dimension of the largest particles of said particulate material.

3. An apparatus as recited in claim 1 wherein said distance d is about 1.25 to 2 times the largest dimension of the largest particles of said particulate material.

4. An apparatus as recited in claim 1 wherein said removing means includes a generally annular land surface oriented generally parallel to the axis of said outer extrusion port with said land surface terminating at said line of intersection.

5. An apparatus as recited in claim 4 wherein said land surface includes scallops oriented generally parallel to the axis of said outer extrusion port.

6. An apparatus as recited in claim 4 wherein said land surface has a length parallel to the axis of said outer extrusion port of about 1/16 inch to about 5/16 inch.

7. An apparatus as recited in claim 6 wherein said distance d is at least about 5/16 inch to about 7/16 inch.

* * * * *